United States Patent [19]

Snodgrass et al.

[11] 4,013,557

[45] Mar. 22, 1977

[54] SEWAGE TREATMENT APPARATUS

[75] Inventors: James D. Snodgrass, Darien; Joseph J. Pilolla, Elmhurst, both of Ill.

[73] Assignee: Sloan Valve Company, Franklin Park, Ill.

[22] Filed: June 6, 1975

[21] Appl. No.: 584,508

[52] U.S. Cl. .............................. 210/138; 204/149; 210/152; 210/167; 210/192; 210/243

[51] Int. Cl.² .......................................... C02B 3/06

[58] Field of Search .................. 4/8, 10; 204/149; 210/44, 59, 64, 86, 109, 112, 138, 149, 152, 167, 192, 243; 251/5

[56] References Cited

UNITED STATES PATENTS

| | | | |
|---|---|---|---|
| 2,658,202 | 11/1953 | Wolman et al. | 4/8 |
| 3,340,175 | 9/1967 | Mehl | 204/149 X |
| 3,415,378 | 12/1968 | Fukuda | 210/152 |
| 3,485,472 | 12/1969 | Bozich | 251/5 |
| 3,546,713 | 12/1970 | Gagne | 210/149 X |
| 3,568,215 | 3/1971 | Riedel et al. | 204/149 X |
| 3,629,099 | 12/1971 | Gahmberg et al. | 210/152 X |
| 3,728,245 | 4/1973 | Preis et al. | 204/149 X |
| 3,755,827 | 9/1973 | Riedel et al. | 4/10 |
| 3,922,730 | 12/1975 | Kemper | 210/167 X |
| 3,925,176 | 12/1975 | Okert | 204/149 X |

*Primary Examiner*—Frank A. Spear, Jr.
*Assistant Examiner*—Robert H. Spitzer
*Attorney, Agent, or Firm*—Kinzer, Plyer, Dorn & McEachran

[57] ABSTRACT

A sewage treatment apparatus comprises a casing with an inlet for reception of sewage and a discharge outlet. There are means within the casing for electrolytically treating the sewage therein and there are means for agitating sewage within the casing. There is a valve at the discharge outlet and means for operating the valve to control the passage of sewage after it has been treated by agitation and electrolysis.

27 Claims, 4 Drawing Figures

SEWAGE TREATMENT APPARATUS

BACKGROUND OF THE INVENTION

In prior systems for treating sewage, particularly those relating to waste disposal means for railroad trains and mobile transportation units, the equipment usually consisted of elaborate mechanisms for grinding, treating, storing or burning the waste materials. Such systems did not always satisfactorily dispose of hazardous bacteria which might endanger the ecology or public health, especially when spread along a railroad track roadbed. These devices required many moving parts and elements subject to constant wear and breakage, and therefore repeated repair and replacement was necessary. The devices were also costly to make and difficult to install.

SUMMARY OF THE INVENTION

The present invention relates to a sewage treatment apparatus for use on a railroad car or other mobile transportation unit for example, which renders sewage substantially sterile before allowing it to be discharged from the system.

A primary purpose of the present invention is a sewage treatment apparatus and method in which the sewage is held within a confined zone and simultaneously agitated and electrolytically treated.

Another purpose is a sewage treatment apparatus of the type described including a clear, open passage from the inlet to the outlet for free flow of sewage throughout the apparatus.

Another purpose is a sewage treatment apparatus including control means for limiting the number of sewage deposits within the confined zone of treatment until there has been a discharge.

Another purpose is a sewage treatment apparatus of the type described including a self-closing flexible valve member, operated by fluid pressure, for controlling the passage of treated sewage through the discharge.

Another purpose is a sewage treatment apparatus utilizing turbulence within the treatment zone to agitate the sewage.

Another purpose is a sewage treatment apparatus in which fluid under pressure is introduced into the treatment zone to create turbulence which, in cooperation with projecting surfaces within the zone, is sufficient to agitate and break up the sewage.

Another purpose is a sewage treatment apparatus of the type described including a plurality of annular electrodes positioned along a casing defining the treatment zone, which electrodes provide a potential for electrolytically treating the sewage.

Another purpose is a simply constructed reliably operable sewage treatment apparatus of the general type disclosed.

Another purpose is a sewage treatment apparatus for use on a mobile vehicle, which senses the speed of the vehicle and controls the discharge of sewage in accordance therewith.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

While the invention will be described in connection with a preferred embodiment and shown as though mounted on a railroad passenger car, it will be understood that it is not intended to limit the invention to that embodiment. On the contrary, it is intended to cover all alternatives, modifications and equivalents as may be included within the spirit and scope of the invention as defined by the appended claims.

Figure 1:
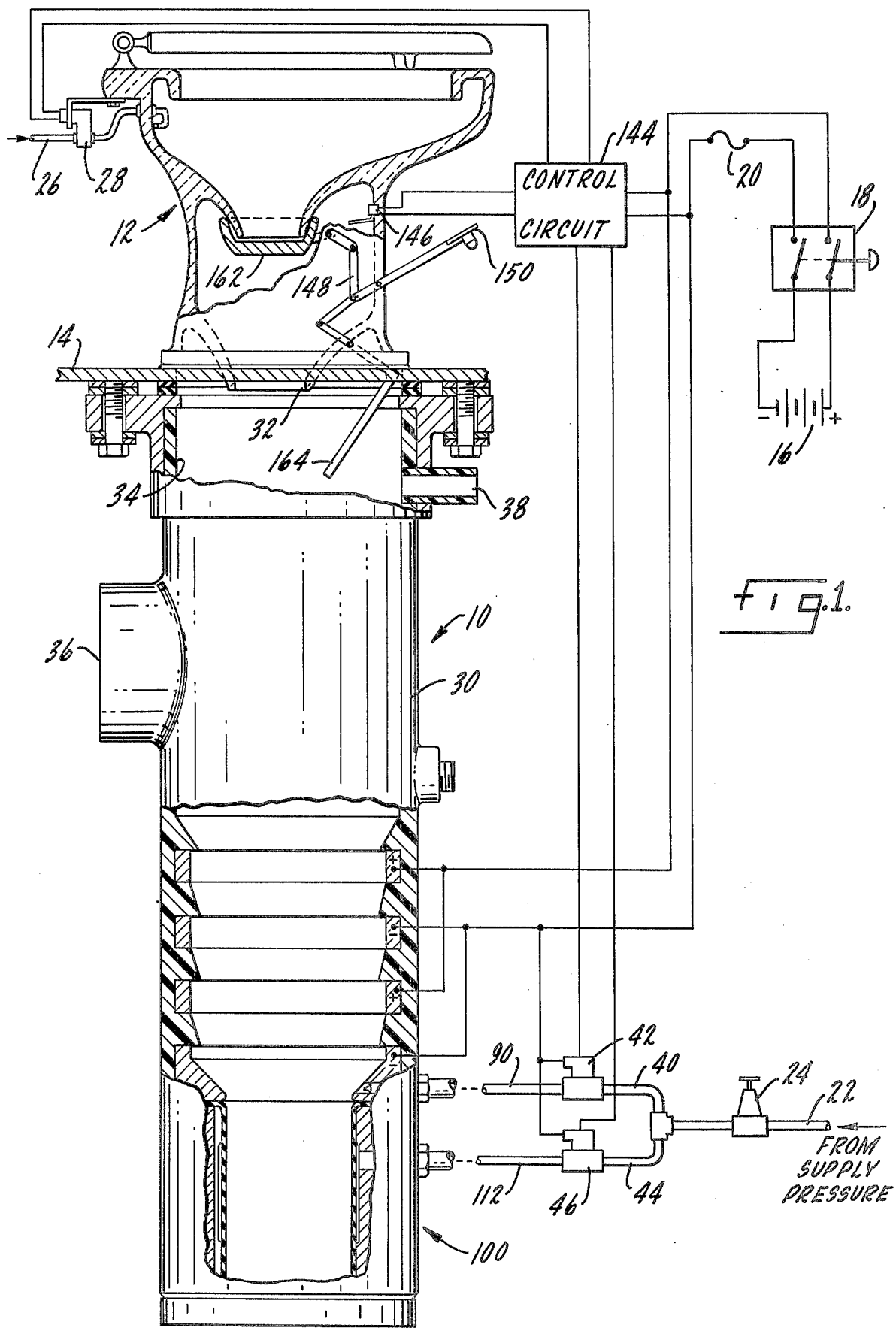
FIG. 1 is a diagrammatic illustration of the sewage treatment apparatus shown in combination with a hopper-type toilet.

In FIG. 1 a sewage treatment apparatus is shown generally at 10 in combination with a conventional hopper-type toilet 12, both being mounted to the floor 14 of the room in which the device is installed.

Electric power is supplied to the apparatus from a battery 16 through a main battery switch 18 and a circuit breaker 20. A supply of fluid pressure is obtained from the vehicle at 22 and directed through a pressure regulator 24. This fluid pressure may be in the form of compressed air, steam or any other fluid pressure which may be available on the vehicle. Water is supplied to the system at 26 and connected to a flush valve 28.

The sewage treatment apparatus 10 has a casing 30 which is shown mounted directly below outlet 32 of toilet 12. In this position outlet 32 communicates directly with inlet 34 of casing 30. It should be noted, however, that casing 30 may not always be mounted directly below toilet 12. Such a situation may arise, for example, when the toilet is mounted directly above the railroad car truck or some other obstruction. In such case, outlet 32 communicates with inlet 34 by means of a conduit (not shown), one end of which is connected to outlet 32 and the other end is connected to a side inlet 36 in casing 30. Side inlet 36 is normally sealed closed, but may be opened when installing the apparatus 10 somewhere other than directly below toilet 12.

The upper end of casing 30 has an opening 38 for venting the inside of the casing to atmosphere. The casing 30 is preferably constructed of a resilient nonconducting material. It must be resilient to withstand the vibrations of the vehicle on which it is mounted and to withstand occasional violent contact with airborne debris without serious damage to internal parts. Such airborne debris is common below railroad cars traveling at high speeds.

Figure 2:
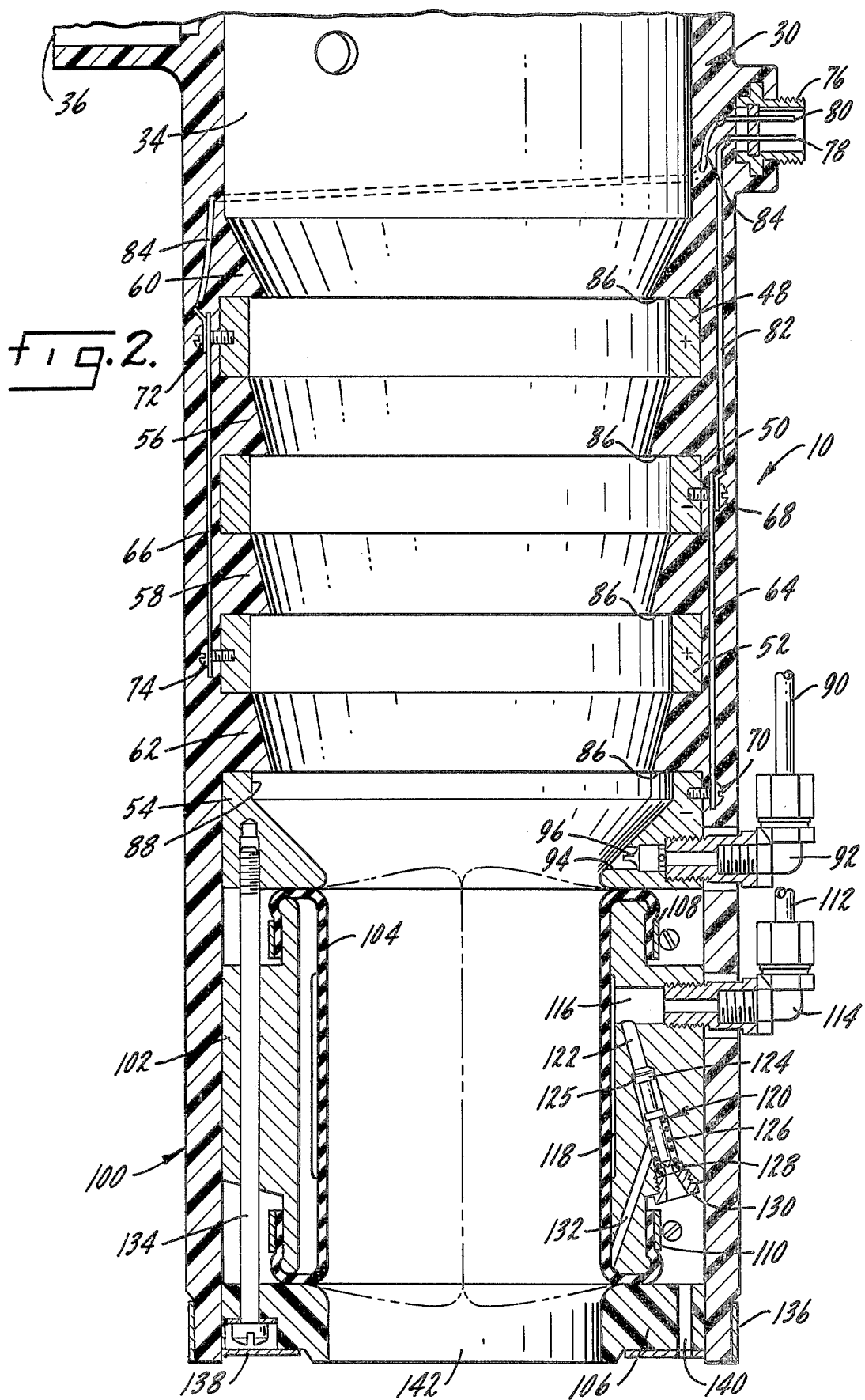
FIG. 2 is an enlarged sectional front view of the sewage treatment apparatus.

Referring to FIG. 2, casing 30 contains a series of spaced ring-shaped electrodes 48, 50, 52 and 54. The electrodes may be molded into the inside wall of casing 30 and insulated from each other by insulating spacers 56 and 58 integral with the casing. Spacer 60 is molded above electrode 48, and spacer 62 is molded below electrode 52 and insulates electrode 52 from electrode 54. It should be noted that the electrodes need not be molded into the casing, but may be inserted into the casing with the appropriate spacers inserted between them. Alternate electrodes are connected to voltages of opposite polarity by means of two bus bars 64 and 66.

Bus bar 64 connects electrodes 50 and 54 through contact screws 68 and 70, respectively. Bus bar 66 connects electrodes 48 and 52 through contact screws 72 and 74, respectively.

Spacers 56, 58, 60 and 62 each have a projecting edge 86 that extends inward of the inside diameter of electrodes 48, 50 and 52, and inward of surface 88 of electrodes 54. The purpose of these projections will be discussed later.

A connector 76 is molded into the outside of the casing and has two voltage terminals 78 and 80. Bus bar 64 is connected to terminal 78 by wire 82 and bus bar 66 is connected to terminal 80 by wire 84. Bus bars 64 and 66 and wires 82 and 84 may be molded into casing 30 with suitable insulation separating elements carrying voltages of opposite polarity.

fluid pressure supply lines 40 and 44 are connected to pressure regulator 24 and are provided with electrically operated valves 42 and 46, respectively. Fluid pressure supply line 90, connected to valve 42, is connected to casing 30 by means of a fitting 92. Fitting 92 extends into one end of a bore 94 in electrode 54. A flexible nozzle 96 is positioned in bore 94 and functions as a normally closed check valve. Nozzle and check valve 96 are arranged to permit flow from line 90 through fitting 92 and bore 94 into the interior of casing 30, and prevent flow back toward line 90.

A flexible pinch valve assembly is provided below electrode 54 and indicated generally at 100. Pinch valve assembly 100 consists primarily of a rigid annular support 102, flexible annular pinch valve member 104, and a bottom plate 106. Support 102 is generally cylindrical in shape as is valve member 104, valve member 104 being slightly longer than support 102. Valve member 104 is inserted inside of support 102, opposite ends of valve member 104 being folded over the ends of support 102, the valve member then being fastened to support 102 by straps 108 and 110.

Fluid pressure line 112, supplied by valve 46, is connected by means of fitting 114 to one end of bore 116 in support 102. The other end of bore 116 opens into an annular space 118 formed in support 102 outside of valve member 104.

Support 102 houses a poppet valve assembly 120 mounted in a bore 122 which connects bore 116 with the area outside of support 102. Assembly 120 consists of a poppet valve member 124 which is closed against a seat 125 by a spring 126. The lower end of spring 126 rests against seat 128 which is held in place by plug 130. A bore 132 communicates with bore 122 between seats 125 and 128 and with the lower end of the inside diameter of support 102.

Support 102, electrode 54 and bottom plate 106 are held together by a plurality of bolts 134. Pinch valve assembly 100 is inserted into the lower end of casing 30 and held in place by strap 136 which is tightened around casing 30 and exerts inward pressure on bottom plate 106. An insulating cover 138 is attached beneath bottom plate 106 by adhesive or other suitable means to prevent anyone who might be handling the mounted sewage treatment apparatus from coming in contact with the heads of bolts 134 which carry an electric potential due to contact with electrode 54. A hole 140 is provided through bottom plate 106 and insulating cover 138 to allow moisture vented by poppet valve assembly 120 to escape to atmosphere. Bottom plate 106 is constructed of an electrically non-conducting material and its opening 142 forms the outlet of the sewage treatment apparatus.

In FIG. 1, a control circuit 144 is connected to a normally open control switch 146 attached to toilet 12. Control switch 146 is closed by linkage 148 when a user depresses flush pedal 150.

Figure 3:
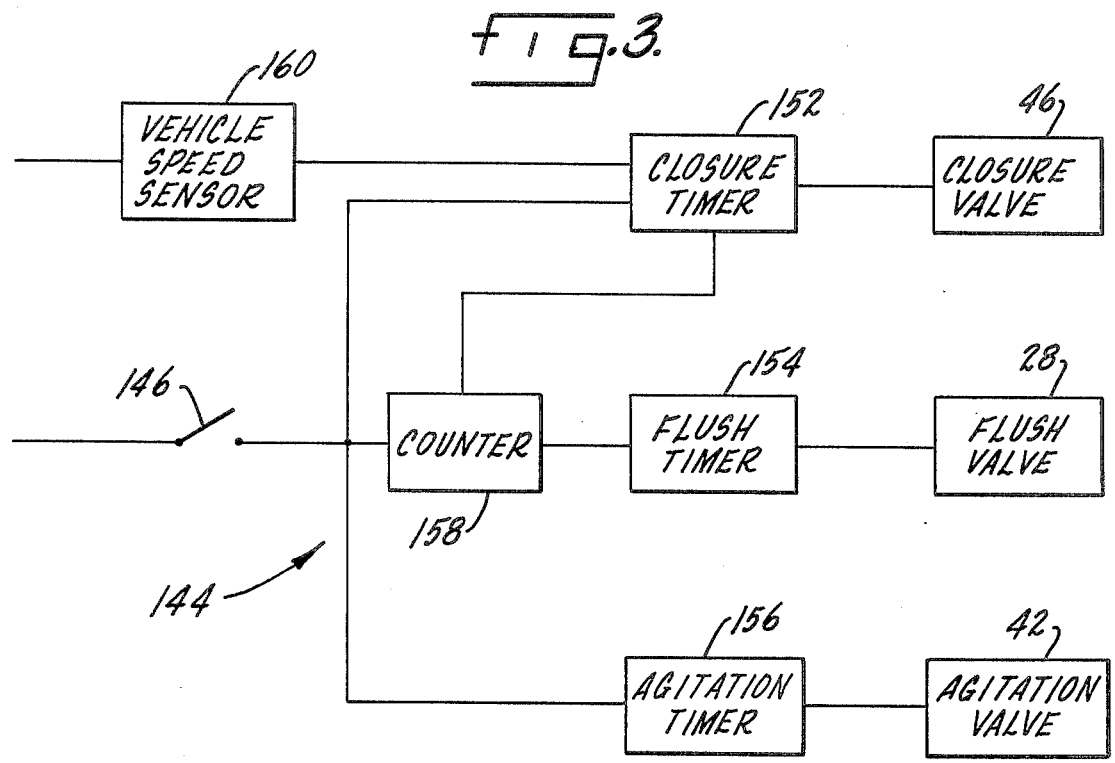
FIG. 3 is a block diagram of the electronic controls.

Flush valve 28, agitation valve 42 and closure valve 46 are shown diagrammatically in FIG. 3. Control switch 146 is connected directly to a closure timer 152 controlling operation of closure valve 46, an agitation timer 156 controlling operation of agitation valve 42 and a counter 158 which is connected to flush timer 154 and to closure timer 152. The circuit is completed by a vehicle speed sensor 160 which is connected to closure timer 152 and to closure valve 46.

Figure 4:
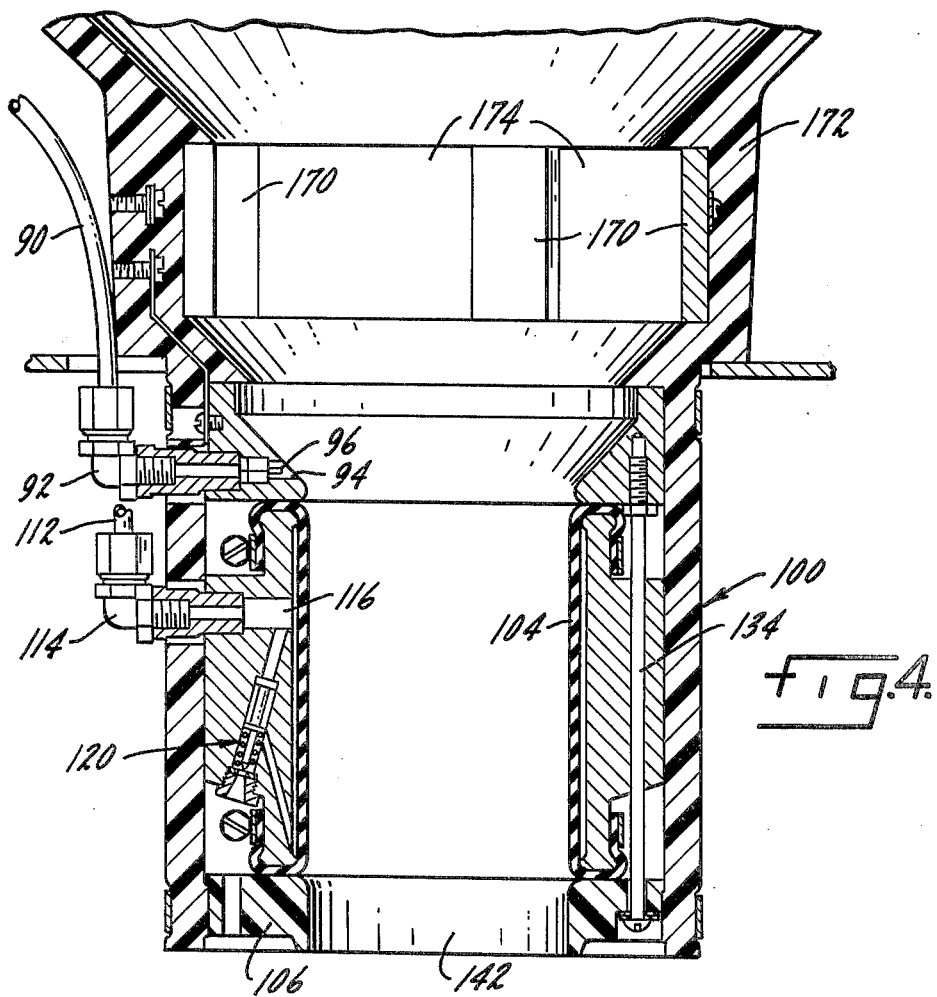
FIG. 4 is a partial sectional front view of a modified form of sewage treatment apparatus.

FIG. 4 shows a modified form of the invention in which like parts have corresponding numbers. In some railroad applications, particularly in new style passenger cars, the floor of the car in the central area is closer to the rails and roadbed than has heretofore been the practice. Accordingly, to provide a sewage treatment apparatus of the general type described, it is necessary to shorten the overall height of the apparatus. This has been accomplished in the construction of FIG. 4 by replacing the annular electrodes of FIG. 1 and 2 with a plurality of generally vertically arranged spaced carbon bars 170. The bars may be suitable held together, for example by embedding them within casing 172. Insulating spacers 174 may electrically separate the bars. The structure of FIG. 4 will operate in the same manner as the structure of FIGS. 1, 2 and 3 as will appear in the following description of the operation.

DESCRIPTION OF THE OPERATION

Referring again to FIG. 1, a user deposits sewage into toilet bowl 12 which comes to rest in upper pan 162. It should be noted at this point that the term "sewage" is intended to include not only human waste and toilet paper, but any and all foreign objects that might be carried off by a sewer. These objects might include wrappers of various descriptions, small bottles, smoking articles and other foreign objects too numerable to mention.

The term "agitate" is used to describe the physical activity of the sewage within the treatment zone caused by the application of an external force. The sewage will be moved in a turbulent manner, by the introduction of fluid pressure. Not only will the sewage turbulently move about the treatment zone, but during the course of such movement, it will impact upon projections within this zone.

After sewage has been deposited in upper pan 162, the user depresses flush pedal 150 which will cause linkage 148 to close control switch 146 and cause lower pan 164 to close upon toilet outlet 32. Simultaneously pan 162 will release the sewage to fall on lower pan 164. Flush pedal 150 is spring-biased to return to its original upward position. Thus, after release control switch 146 opens, upper pan 162 returns to its uper position and lower pan 164 deposits the sewage through inlet 34 into the treatment zone of casing 30.

When switch 146 is closed, timers 152, 154 and 152 simultaneously open valves 46 and 42 and operate flush valve 28. The timers will hold the valves open for predetermined periods. Each closure of switch 146 will be registered in counter 158, which, as described hereinafter, is utilized to limit the amount of sewage and water which can be deposited within the treatment zone at any one time.

Each of the timers may have predetermined time periods during which they will hold their respective valves in an open condition. Normally these time periods will vary and as an illustrative example, closure valve 46 may be held open for 90 seconds, agitation valve 42 for 60 seconds, with flush valve 28 being held open a sufficient period of time to provide a predetermined volume of water, for example one quart. The time period for flush timer 154 is determined by the necessary volume of water; the time period of timer 156 must be sufficient to blend the sewage into a substantially homogeneous liquid; and the time period for closure timer 152 must be sufficient for the electrolytic action to render the sewage substantially sterile.

As indicated above, the closure of switch 146 will cause simultaneous operation of valves 28, 46 and 42. Operation of flush valve 28 will provide a predetermined volume of water for toilet bowl 12, which volume of water will be used to flush the sewage from within the toilet into the area defined by the closure of lower pan 164. When foot pedal 150 is released, the sewage and water will fall into the treatment within casing 30.

Valve 46 opens to permit fluid pressure to pass into annular space 118 outside of pinch valve member 104 to cause the valve member to close upon itself as shown by the dotted line representation in FIG. 2. At the same time, valve 42 will open permitting fluid pressure to pass through flexible nozzle 96 into the treatment zone where the sewage will be agitated by the turbulent action of the introduced fluid pressure, as will be described. The electrodes may be continuously supplied with their electric potential or suitable circuitry may be added whereby the electrodes are only operated for a predetermined period.

Considering specifically the closure of pinch valve member 104, the introduction of pressure into space 118 causes the valve member to fold inwardly upon itself. Poppet valve assembly 120 is used to vent any accumulated moisture which may occur if the supply of fluid pressure is compressed air. During the closure of valve member 104 any moisture which has accumulated outside of the valve member and between the valve member and support 102, will be vented upwardly through passage 132 and then out through the opening in plug 130. As the pressure in bore 116 continues to increase, sufficient pressure is exerted on the top of poppet valve member 124 to compress spring 126. This causes poppet valve member 124 to move downwardly and seal against seat 128. As indicated above, valve 146 will remain in its open condition for a duration controlled by timer 152, which duration will be sufficient to allow the treatment process to be completed. At such time as it is completed, valve 104 will open, permitting the sewage from within the treatment zone to be discharged through opening 142.

At the end of the timing cycle of timer 152, valve 46 being a three-way valve will be effective to vent pressure within line 112 and bore 116 to atmosphere, permitting valve member 104 to return to its original position.

Although the flexible valve member 104 has been described as being normally open, in some applications it may be desirable to have it in a normally closed condition, opening only to discharge treated sewage and then automatically reclosing. Such a situation might arise where the device is to be used in an extremely cold environment, the closure being necessary to prevent snow from clogging the discharge opening.

The opening of agitation valve 42 will cause fluid pressure to be introduced through flexible nozzle 96 into the treatment zone defined by casing 30. Such pressure will cause a violent turbulent motion within the treatment zone which will cause the sewage to strike the projecting edges of surfaces 86. The turbulent action of the sewage, as well as the force of impact upon the projections, will cause the sewage to be agitated and broken up, the end result being a substantially homogeneous liquid.

The agitation process will continue as long as valve 42 is held in an open condition which, as described above, may be on the order of about 60 seconds. During and subsequent to the agitation process, the sewage will be in contact with at least two electrodes of opposite polarity. Since sewage is by its impure nature an efficient electrolyte, an electric current will be developed through the sewage and between the electrodes while the sewage is held in the casing. The passage of current through the sewage causes electrolysis and kills bacteria, thus rendering the sewage substantially sterile. Although it is not known exactly what kills the bacteria, the fact that this phenomenon occurs is well known in the art. Reference may be had to an article entitled "Sterilization by Electro Hydraulic Treatment", co-authored by Merton Allen and Kenneth Soike of General Electric Company and the Albany Medical College, respectively, published in the Oct. 7, 1966 edition of Science Magazine, Volume 154, pp. 155–157.

There are times when control switch 146 may be closed one or more times before closure timer 152 has completed its timing cycle to cause discharge of the sewage within the treatment zone. Each time swich 146 is closed, timers 152, 154 and 156 are all reset to re-initiate their respective timing cycles. However, since the treatment zone can only contain a predetermined amount of liquid, the number of flushing operations that can be tolerated prior to the opening of valve member 104 must be regulated. Thus, counter 158 will permit three successive flushing operations, without the opening of closure valve 46, but will not permit a fourth. After counter 158 reaches a count of three, it will no longer permit flush timer 154 to be reset and thus flush valve 28 to be opened until such time as timer 152 completes its present timing cycle. Counter 158 is reset to zero every time closure timer 152 completes its timing cycle. Thus, after counter 158 has been reset, it will subsequently permit the same predetermined number of flushing operations as described.

Although the described circuitry will control the number of successive flushing operations, casing 30 has an overflow vent 38 in the event that it is overfilled.

Since the treatment apparatus disclosed herein is adaptable for use on vehicles, for example railroad cars, there are situations in which it is unacceptable to discharge treated sewage. Accordingly, vehicle speed sensor 160 will hold valve member 104, through closure valve 46, in a closed position as long as the speed of the vehicle is below a predetermined value, for example 15 miles per hour. The speed sensor 160 is effective to override closure timer 152 and hold valve 46 in an open position as long as the speed is below the prescribed minimum. Termination of the speed sensor override will actuate the timing cycle of closure timer 152, so that there will be a predetermined interval before sewage can be subsequently discharged. During the period that speed sensor 160 maintains valve member 104 in a closed position, counter 158 will continue to operate to limit the number of successive flushing operations.

Although speed sensor 160 is specifically designed to prevent discharge of treated sewage while the vehicle is standing or moving slowly, it can also be used in a manner to prevent discharge of treated sewage in predetermined areas, for example heavily populated areas.

Although the invention has been described as being applicable to vehicles, it should also be understood that there are some applications for the treatment apparatus in which it will not be on a moving object or vehicle. There are situations in which it is not possible to connect to a conventional sewage system, for example in remote areas, and thus the apparatus disclosed may be useful in buildings or the like.

The invention should not be limited to any particular closure valve member, although the pinch valve disclosed has been found to be particularly satisfactory and useful. In like manner, although agitation is accomplished herein by the use of fluid pressure and projecting surfaces, it should be understood that there may be other ways of providing an agitating action within the treatment zone which can be utilized in conjunction with the electrodes of opposite polarity.

Whereas the preferred form of the invention has been shown and described herein, it should be realized that there may be many modifications, substitutions and alterations thereto.

The embodiments of the invention in which an exclusive property or privilege is claimed are defined as follows:

1. A sewage treatment apparatus comprising a casing having an inlet for reception of sewage and a discharge outlet, valve means adjacent said discharge outlet, a plurality of electrodes positioned about said casing between said valve means and inlet for providing an electrical potential to electrolytically treat sewage in said casing thereby rendering it substantially sterile, said electrodes and the interior of said casing defining a substantially open and unobstructed central treatment zone, means for closing said valve means to temporarily hold a batch of sewage within said zone, means for introducing a fluid under pressure into the casing at said central treatment zone and adjacent said electrodes to provide agitation and turbulence within the treatment zone resulting in a substantially homogeneous sewage liquid, means defining a plurality of projections positioned about said treatment zone and adjacent said electrodes to assist in reducing the sewage, and means for opening said valve means to discharge the batch of treated sewage.

2. The structure of claim 1 further characterized in that said means for creating turbulence within said casing includes a nozzle projecting into the casing and having a normally closed flexible check valve.

3. The structure of claim 1 further characterized in that said casing is formed of a resilient electrically non-conducting material.

4. The structure of claim 1 further characterized in that said valve means is normally open to provide a normally clear passage between said inlet and outlet.

5. The structure of claim 4 further characterized in that said casing is arranged vertically with the inlet at the upper end and the outlet at the lower end.

6. The structure of claim 1 further characterized in that said valve means is normally closed.

7. The structure of claim 1 further characterized by and including means associated with said casing for depositing sewage into said casing inlet.

8. The structure of claim 7 further characterized in that said depositing means includes means for flushing a regulated quantity of water with the sewage into said casing.

9. The structure of claim 8 further characterized in that said depositing means includes normally a closed valve for containing the sewage therewithin, and means for opening said normally closed valve for depositing the sewage into said casing.

10. The structure of claim 9 further characterized by and including means for coordinating operation of said flushing means and said means for opening said normally closed valve.

11. The structure of claim 1 further characterized in that said casing valve means includes a flexible member secured to said casing and means for causing said flexible member to close upon itself.

12. The structure of claim 11 further characterized in that said flexible member is generally annular in construction, and means for introducing fluid under pressure between said casing and said flexible member to cause said flexible member to close upon itself.

13. The structure of claim 12 further characterized in that said annular member is supported on a portion of said casing, an annular chamber positioned outside of said flexible member, and means for providing a source of fluid under pressure for said annular chamber.

14. The structure of claim 13 further characterized by and including means for draining moisture from between said annular member and casing.

15. The structure of claim 11 further characterized in that said means for providing an electrical potential include a plurality of spaced generally annular electrodes, positioned by and within said casing, with one of said electrodes being generally adjacent one end of said flexible valve member.

16. The structure of claim 1 further characterized in that said means for providing an electrical potential include at least two electrodes positioned within and supported by said casing, and means for providing voltage of different polarity to said electrodes.

17. The structure of claim 16 further characterized in that said electrodes are generally annular in form and are supported by an inside wall of said casing.

18. The structure of claim 17 further characterized by and including insulating means between adjacent electrodes.

19. The structure of claim 16 further characterized by and including a plurality of spaced recesses on the interior of said casing, said electrodes being annular in form and being positioned within said recesses.

20. The structure of claim 19 further characterized in that said projections are formed integrally with said casing in the area between adjacent recesses.

21. The structure of claim 20 further characterized in that said projecting surfaces are annular in configuration, with each projecting surface forming an annular edge within said casing.

22. The structure of claim 1 further characterized by and including a vent outlet in said casing adjacent the inlet thereof.

23. The structure of claim 1 further characterized by and including means for coordinating operation of said agitating means and said operating means for said valve means, whereby said valve means is closed during agitation and opens thereafter.

24. The structure of claim 23 further characterized by and including means for depositing sewage into said casing, and means for controlling said depositing means in coordination with said agitating means and said valve operating means.

25. The structure of claim 24 further characterized in that said coordinating means include timing means for timing the operation of said valve operating means, said agitating means and said depositing means.

26. The structure of claim 25 further characterized by and including a counter associated with said depositing means for regulating the deposit of sewage into said casing in accordance with operation of said valve means.

27. The structure of claim 24 further characterized in that said sewage treatment apparatus is adapted to be mounted on a moving vehicle, and means for sensing the speed of said vehicle and for controlling the operation of said valve operating means.

* * * * *